(12) United States Patent
Hiyama

(10) Patent No.: US 8,720,538 B2
(45) Date of Patent: May 13, 2014

(54) COLD ENERGY STORAGE SYSTEM FOR VEHICLE

(75) Inventor: Jinichi Hiyama, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 1179 days.

(21) Appl. No.: 12/451,613

(22) PCT Filed: May 21, 2008

(86) PCT No.: PCT/JP2008/059338
§ 371 (c)(1),
(2), (4) Date: Nov. 20, 2009

(87) PCT Pub. No.: WO2008/143283
PCT Pub. Date: Nov. 27, 2008

(65) Prior Publication Data
US 2010/0116485 A1    May 13, 2010

(30) Foreign Application Priority Data
May 22, 2007   (JP) ................... 2007-135438

(51) Int. Cl.
*B60H 1/00*    (2006.01)
*F28D 17/00*   (2006.01)
*F28D 19/00*   (2006.01)
*F25D 3/00*    (2006.01)
*F25D 17/00*   (2006.01)

(52) U.S. Cl.
USPC ............... 165/202; 165/10; 62/59; 62/180

(58) Field of Classification Search
USPC ............... 165/10, 41, 202; 62/59, 180
See application file for complete search history.

(56) References Cited

U.S. PATENT DOCUMENTS

| | | | | |
|---|---|---|---|---|
| 4,258,696 | A | * | 3/1981 | Gopal .............................. 165/10 |
| 4,505,124 | A | * | 3/1985 | Mayer ............................. 62/180 |
| 4,831,830 | A | * | 5/1989 | Swenson .......................... 62/59 |
| 5,314,586 | A | * | 5/1994 | Chen ............................. 202/177 |

(Continued)

FOREIGN PATENT DOCUMENTS

| | | |
|---|---|---|
| JP | 55-23822 | 2/1980 |
| JP | 6-211030 | 8/1994 |

(Continued)

OTHER PUBLICATIONS

International Search Report issued Aug. 5, 2008 in International (PCT) Application No. PCT/JP2008/059338.

*Primary Examiner* — Ljiljana Ciric
(74) *Attorney, Agent, or Firm* — Wenderoth, Lind & Ponack, L.L.P.

(57) ABSTRACT

A cold energy storage system for a vehicle includes an air-conditioning unit that includes an evaporator and a heater core. The system stores cold energy during a cooling operation and supplements the cooling operation by using the stored cold energy after stoppage of the cooling operation. A cold energy storage tank (50) connects in parallel to an engine cooling circulation circuit to the heater core. The storage tank (50) has a liquid storage layer (50A) for engine coolant and a refrigerant layer (50B) in which refrigerant from the evaporator flows. A mode switcher switches between a storing cold energy mode and a cooling supplement mode. In the storing cold energy mode, engine coolant stored in the liquid storage layer (50A) is refrigerated during the cooling operation. In the cooling supplement mode, refrigerated engine coolant from the liquid storage layer (50A) is introduced to the heater core.

7 Claims, 8 Drawing Sheets

(56) References Cited

U.S. PATENT DOCUMENTS

| | | | | |
|---|---|---|---|---|
| 5,696,872 | A * | 12/1997 | Seward | 219/400 |
| 6,158,499 | A * | 12/2000 | Rhodes et al. | 165/10 |
| 7,024,885 | B2 * | 4/2006 | Villalobos | 62/606 |
| 7,156,156 | B2 | 1/2007 | Haller et al. | |
| 8,220,284 | B2 * | 7/2012 | Tsubone | 165/10 |
| 8,495,894 | B2 * | 7/2013 | Kerler et al. | 165/10 |
| 8,505,313 | B2 * | 8/2013 | Narayanamurthy | 62/59 |
| 2006/0288727 | A1 | 12/2006 | Aikawa et al. | |

FOREIGN PATENT DOCUMENTS

| | | |
|---|---|---|
| JP | 2002-301928 | 10/2002 |
| JP | 2004-142551 | 5/2004 |
| JP | 2004-142596 | 5/2004 |
| JP | 2004-184071 | 7/2004 |
| JP | 2007-1485 | 1/2007 |

* cited by examiner

WHEN MAXIMUM COOLING OPERATION IS PERFORMED

WHEN TEMPERATURE CONTROL OPERATION AND STORING COLD ENERGY OPERATION ARE PERFORMED

WHEN STORING COLD ENERGY IS COMPLETED

COOLING OPERATION STATE
WHEN IDLING STOP IS PERFORMED

COLD ENERGY STORAGE SYSTEM FOR VEHICLE

TECHNICAL FIELD

This invention relates to a cold energy storage system for a vehicle, in which cold energy is stored when a cooling operation is performed, and the stored cold energy is used for supplementing the cooling operation after the cooling operation is stopped.

BACKGROUND

As a conventional cold energy storage system for a vehicle, a structure that is applied to an air-conditioning evaporator for a car, and a hollow space for heat storage liquid is disposed adjacent to a circulation line of a coolant of the evaporator, and cold energy is stored in the heat storage liquid when the coolant is circulated, and when the circulation of the coolant is stopped, heat exchange between the heat storage liquid storing the cold energy and an air flow is performed is known (for example, see Japanese Patent Publication No. 2004-184071).

As another conventional cold energy storage system for a vehicle, a structure that includes a stored cold energy exchanger having a cold energy storage material inside, and stores cold energy in the cold energy storage material in the stored cold energy exchanger by a low-temperature refrigerant that flows from an evaporator when a compressor is operated, and is capable of continuing to refrigerate conditioned air by the evaporator when the compressor is stopped is known (for example, see Japanese Patent Publication No. 2007-1485).

As still another conventional cold energy storage system for a vehicle, a structure that blocks the flow of an engine coolant to a heater (heater core) by a deceleration judgment, and stores cold energy by passing the air after passing through a cooler (an evaporator) through the heater, and introduces air to the heater and releases the stored cold energy when an idling stop is performed is known (for example, see Japanese Patent Publication No. 2004-142596).

DISCLOSURE OF THE INVENTION

Problem to be Solved by the Invention

However, according to the cold energy storage system for a vehicle disclosed in Japanese Patent Publication No. 2004-184071, a structure of the evaporator is such that the hollow space of the heat storage liquid is disposed adjacent to the circulation line of the coolant; therefore an existing evaporator having only a circulation line of a coolant is not allowed to be used, and it is necessary to prepare a new high-cost evaporator having a complicated structure. In addition, a filling amount of the heat storage liquid filled in a hollow space set in a heat exchange area of the evaporator is limited; therefore, after the circulation of the coolant is stopped, there is a problem such that a supplement time for the cooling operation is short.

According to the cold energy storage system for the vehicle disclosed in Japanese Patent Publication No. 2007-1485, when the compressor is stopped, the refrigerant continues to flow to the evaporator by a residual pressure between a condenser and the evaporator. The residual pressure between the condenser and the evaporator is generated by the stored cold energy of the cold energy storage material. On the other hand, the storable cold energy capacity of the cold energy storage material in the stored cold energy exchanger is limited, and even if the stored cold energy remains, when a necessary residual pressure is not generated, the flow of the refrigerant to the evaporator is stopped; therefore, there is a problem such that a supplement time for the cooling operation is short, after the compressor is stopped.

According to the cold energy storage system for the vehicle disclosed in Japanese Patent Publication No. 2004-142596, due to refrigeration by cold air, in which cold energy is stored in the engine coolant by passing the air passed through the evaporator passed through the heater core, an effect of storing cold energy is small. Moreover, an idling stop is performed, air is introduced to the heater core and the stored cold energy is released; however, since the filled water in the heat exchange area of the heater core is limited, there is a problem such that a supplement time for the cooling operation is short after the idling stop is performed.

An object of the present invention is to provide a cold energy storage system for a vehicle in which the structure remains the same as existing air conditioners, and which ensures advantages of cost and space, and is capable of achieving a supplement for the cooling operation for a requested time by the cold energy stored when the cooling operation is performed after the cooling operation is stopped.

Solution to Problem

In order to achieve the above object, a cold energy storage system for a vehicle is provided which comprises an air-conditioning unit incorporating a heater core and an evaporator, and stores cold energy when the cooling operation is performed, and supplements the cooling operation by use of the stored cold energy after the cooling operation is stopped. The cold energy storage system for the vehicle comprises a cold energy storage tank connected in parallel to an engine coolant circulation circuit to the heater core and having a liquid storage layer of the engine coolant and a refrigerant layer in which the refrigerant from the evaporator flows, and a mode switcher switching between a storing cold energy mode where the engine coolant stored in the liquid storage layer is refrigerated by the refrigerant from the evaporator when the cooling operation is performed and a cooling supplement mode where the refrigerated engine coolant in the liquid storage layer is introduced to the heater core after the cooling operation is stopped.

DESCRIPTION OF NUMERALS

Figure 1:
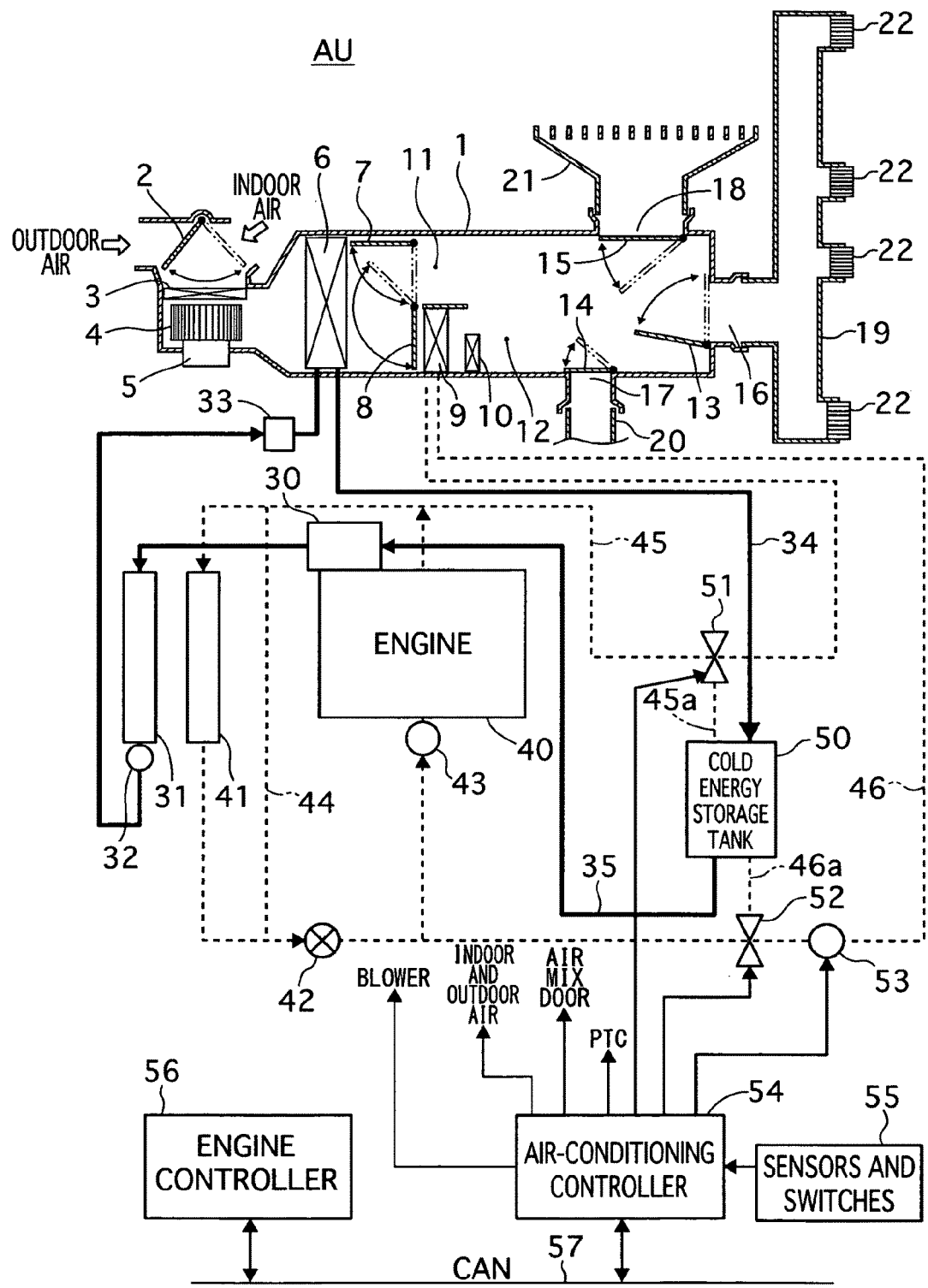
FIG. 1 is a whole system diagram illustrating a cold energy storage system for a vehicle according to Embodiment 1 of the present invention.

AU air-conditioning unit
1 air conditioner case
2 air intake door
3 air-conditioning filter
4 blower
5 blower motor
6 evaporator
7 first air mix door (temperature control door)
8 second air mix door (temperature control door)
9 heater core
10 PTC (positive temperature coefficient) heater (heating supplement device)
11 cold air bypass passage
12 hot air passage
13 vent door
14 foot door
15 defrost door
16 vent outlet
17 foot outlet
18 defrost outlet
19 vent duct
20 foot duct
21 defrost duct
22 vent grill
30 compressor
31 condenser
32 receiver
33 expansion valve
34 first outlet circuit of the evaporator
35 second outlet circuit of the evaporator
40 engine
41 radiator
42 thermostat valve
43 water pump
44 bypass circuit
45 heater core inlet circuit
46 heater core outlet circuit
50 cold energy storage tank
50a liquid storage layer
50b refrigerant layer
50c vacuum insulation layer
50d cold energy storage material layer
50e latent heat storage material
51 first switching valve (switching valve)
52 second switching valve (switching valve)
53 circulation pump
54 air-conditioning controller (mode switching controller)

BEST MODE FOR CARRYING OUT THE INVENTION

Hereinafter, referring to Embodiment 1, Embodiment 2, and the drawings, the best mode for achieving the cold energy storage system for the vehicle of the present invention will be explained.

Embodiment 1

Firstly, a structure of the cold energy storage system for the vehicle according to the present invention will be explained.

Figure 2:
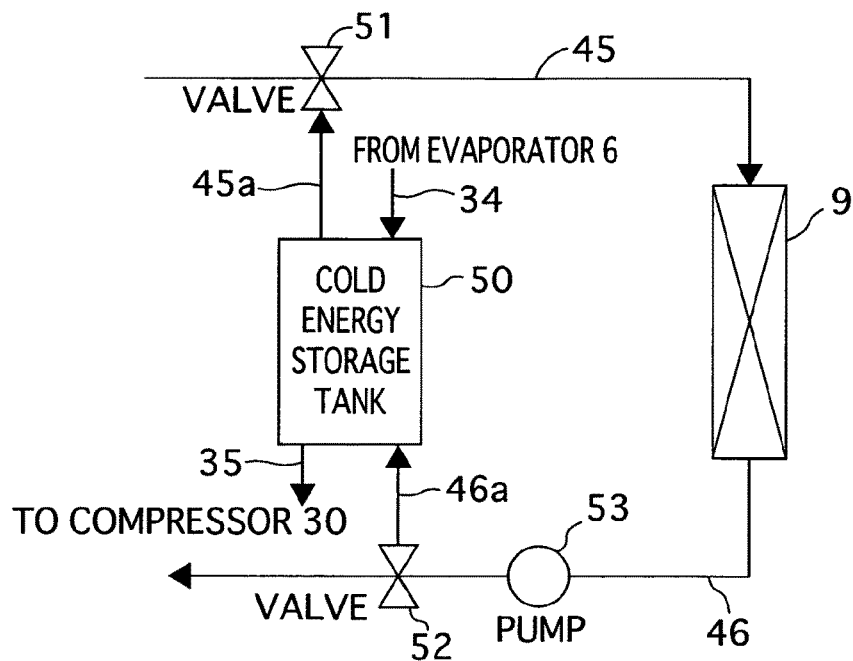
FIG. 2 is a cycle diagram illustrating a chief part for storing cold energy of the cold energy storage system for the vehicle according to Embodiment 1.
Figure 3:
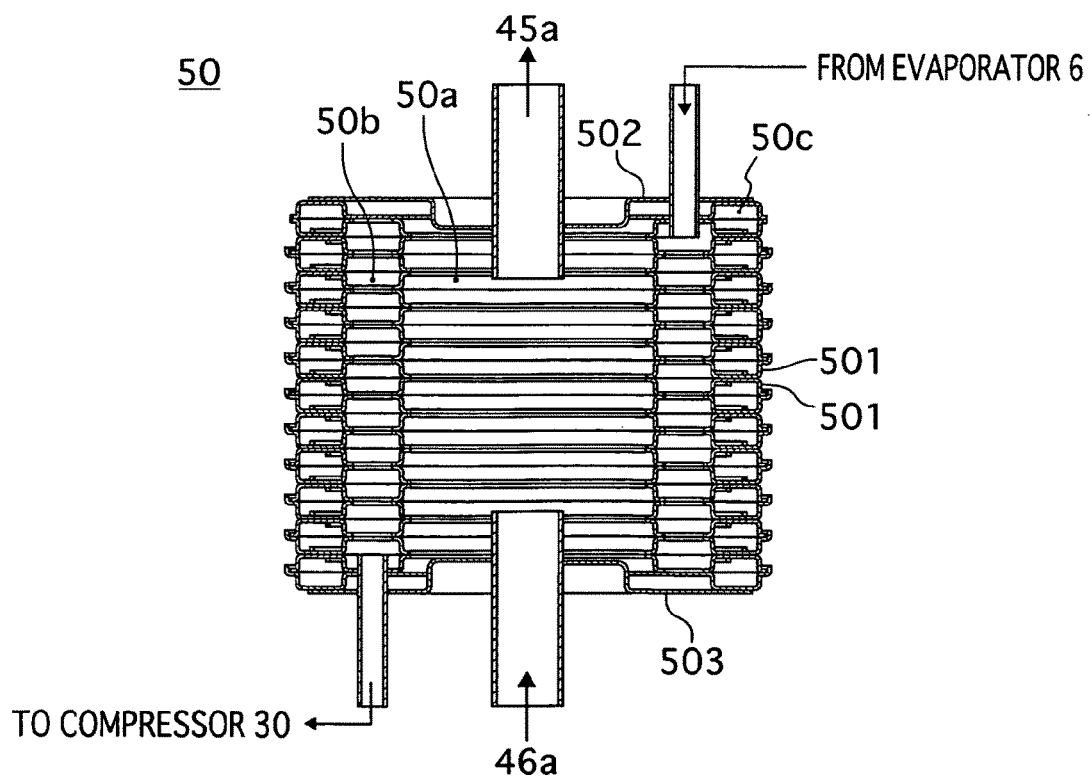
FIG. 3 is a cross-sectional diagram illustrating an example of a cold energy storage tank used for the cold energy storage system for the vehicle according to Embodiment 1.

FIG. 1 illustrates a whole structure of the cold energy storage system for the vehicle of Embodiment 1, FIG. 2 illustrates a cycle of a chief part for storing cold energy of the cold energy storage system for the vehicle of Embodiment 1, and FIG. 3 illustrates an example of a cold energy storage tank used for the cold energy storage system for the vehicle of Embodiment 1.

An air-conditioning unit AU to which the cold energy storage system for the vehicle of Embodiment 1 is applied comprises, as illustrated in FIG. 1, an air conditioner case 1, an air intake door 2, an air-conditioning filter 3, a blower 4, a blower motor 5, an evaporator 6, a first air mix door 7 (temperature control door), a second air mix door 8 (temperature control door), a heater core 9, a PTC (positive temperature coefficient) heater 10 (heating supplement device), a cold air bypass passage 11, a hot air passage 12, a vent door 13, a foot door 14, a defrost door 15, a vent outlet 16, a foot outlet 17, a defrost outlet 18, a vent duct 19, a foot duct 20, a defrost duct 21, and a vent grill 22.

The air intake door 2 is a door which switches between an outdoor air introduction mode (a phantom line position in FIG. 1) and an indoor air circulation mode (a solid line position in FIG. 1), and an indoor and outdoor air switching control is performed by a switching drive of a door actuator, which is not illustrated.

The evaporator 6 is a heat exchanger for cooling which refrigerates indoor air or outdoor air passing through the air conditioning filter 3 and the blower 4, and has a refrigerant inlet and a refrigerant outlet. The blower 4 is driven by the blower motor 5, and a blower control which changes an air volume is performed by a drive control over the blower motor 5.

The first air mix door 7 and the second air mix door 8 are disposed at a downstream position of the evaporator 6, and control a mixture proportion of cold air passed to the evaporator 6 and hot air passed to the heater core 9 by a door opening. The first air mix door 7 opens and closes the cold air bypass passage 11, and the second air mix door 8 opens and closes the hot air passage 12. Moreover, as for both the first and second air mix doors 7 and 8, the door opening is controlled independently by the door actuator.

The heater core 9 is disposed at a downstream position of the evaporator 6 and the second air mix door 8, and is a heat exchanger for heating which heats passing air, and has an engine coolant inlet and an engine coolant outlet.

The PTC heater 10 is a sheet heating element which automatically performs a temperature control by a control of electrical resistance by a resin (PTC resin: insulator) and a resistor (carbon particles: conductor) in the heater. PTC is a positive temperature coefficient. Since the PTC resin expands with an increase in temperature, intervals between the carbon particles are widened and the electrical resistance is increased, and an electric current is decreased and the temperature is decreased. When the temperature is decreased, the PTC resin contracts, and therefore the intervals between the carbon particles are narrowed and the electrical resistance is decreased, and the electric current is increased and the temperature is increased. By repeating the above states, a temperature control is performed automatically. The PTC heater 10 has a characteristic such that the speed of the increase in temperature is fast after being electrified, and is preferable as a device which supplements heating. A PTC control which supplements heating is performed when an engine is started where the temperature of the engine coolant is low and so on.

The vent door 13 is disposed at a position of the vent outlet 16 on a downstream side of the cold air bypass passage 11 and the hot air passage 12, and is opened when a vent mode or the like is selected as an outlet mode. The vent outlet 16 is coupled to the vent duct 19 to introduce cold air and the like to left and right positions and a center position of front seats in a cabin. At an opening position of the vent duct 19 to the cabin, the vent grill 22 which is capable of adjusting an air direction is set.

The foot door 14 is disposed at a position of the foot outlet 17 on the downstream side of the cold air bypass passage 11 and the hot air passage 12, and is opened when a foot mode or the like is selected as the outlet mode. The foot outlet 17 is coupled to the foot duct 20 to introduce hot air and the like to persons' feet in the car cabin at the left and right of the front seats.

The defrost door 15 is disposed at a position of the defrost outlet 18 on the downstream side of the cold air bypass passage 11 and the hot air passage 12, and is opened when a defrost mode or the like is selected as the outlet mode. The defrost outlet 18 is coupled to the defrost duct 21 to guide hot air and the like along an inner surface of a windshield (or a windscreen).

A refrigeration cycle including the evaporator 6 of the air conditioning unit AU to which the cold energy storage system for the vehicle of Embodiment 1 is applied comprises, as illustrated in FIG. 1, a compressor 30, a condenser 31, a receiver 32, and an expansion valve 33.

The compressor 30 is driven by an engine 40, and compresses a gaseous refrigerant into a refrigerant with high temperature and high pressure, and sends it to the condenser 3. In an engine drive pulley of the compressor 30, an electromagnetic clutch is incorporated, and a compressor control which controls drive and stop of the compressor 30 is performed by the electromagnetic clutch. As the compressor 30, a fixed-capacity compressor, or a variable capacity compressor may be used.

In the condenser 31, the refrigerant with high temperature and high pressure discharged from the compressor 30 releases heat and becomes a liquefied refrigerant, and then it is sent to the receiver 32.

In the receiver 32, moisture and dust are removed from the refrigerant liquefied by the condenser 31, and then it is sent to the expansion valve 33.

By the expansion valve 33, a pressure of the liquefied refrigerant with high pressure is decreased, and the liquefied refrigerant rapidly expands, and becomes a misty refrigerant with low temperature and low pressure, and then it is sent to the evaporator 6.

In the evaporator 6, the misty refrigerant flows from the expansion valve 33, and absorbs heat from surrounding air in the air conditioner case 1 and evaporates, and becomes a gaseous refrigerant, and then it is sent to the compressor 30 again through a first outlet circuit of the evaporator 34, a cold energy storage tank 50 and a second outlet circuit of the evaporator 35.

A hot water cycle including the heater core 9 of the air-conditioning unit AU to which the cold energy storage system for the vehicle according to Embodiment 1 is applied comprises, as illustrated in FIG. 1, the engine 40, a radiator 41, a thermostat valve 42, a water pump 43, and the heater core 9.

A first circulation route of the engine coolant (hot water) is constructed by the engine 40, the radiator 41 or the bypass circuit 44, the thermostat valve 42, and the water pump 43. A second circulation route of the engine coolant (hot water) is constructed by the engine 40, the heater core inlet circuit 45, the heater core 9, the heater core outlet circuit 46, and the water pump 43. In both of the circulation routes, the engine coolant is kept at a suitable temperature by controlling the circulation routes with the thermostat valve 42 which is opened and closed at a set temperature.

The cold energy storage system for the vehicle of Embodiment 1, as illustrated in FIG. 1, comprises a cold energy storage tank 50, a first switching valve 51 (switching valve), a second switching valve 52 (switching valve), a circulation pump 53, and an air-conditioning controller 54 (mode switching controller).

The cold energy storage system for the vehicle having the air-conditioning unit AU incorporating the evaporator 6 and the heater core 9, stores cold energy when the cooling operation is performed, and after the cooling operation is stopped, supplements the cooling operation by using the stored cold energy, by a mode switcher.

The cold energy storage tank 50, as illustrated in FIGS. 2 and 3, connects in parallel to the circulation routes of the engine coolant (the heater core inlet circuit 45 and the heater core outlet circuit 46) to the heater core 9, and as illustrated in FIG. 3, has a liquid storage layer 50a of the engine coolant and a refrigerant layer 50b in which a refrigerant from the evaporator 6 flows. The cold energy storage tank 50, as illustrated in FIG. 3, has an inside layer, an intermediate layer, and an outside layer. The inside layer serves as the liquid storage layer 50a of the engine coolant, the intermediate layer serves as the refrigerant layer 50b in which the refrigerant from the evaporator 6 flows, and the outside layer serves as a vacuum insulation layer 50c. In addition, the cold energy storage tank 50, as illustrated in FIG. 3, is a stacked storage tank where the liquid storage layer 50a, the refrigerant layer 50b and the vacuum insulation layer 50c are formed by alternately inverting and stacking a plurality of tank constructional elements 501 having the same shape and blocking an opening of the stacked tank constructional elements with an inlet-side lid plate 502 and an outlet-side lid plate 503.

The mode switcher switches between a storing cold energy mode where the engine coolant stored in the liquid storage layer 50a is refrigerated by the refrigerant from the evaporator 6 when the cooling operation is performed, and a cooling supplement mode where the cooled engine coolant in the liquid stored layer 50a is introduced to the heater core 9 after the cooling operation is stopped. As the mode switcher, the first switching valve 51, the second switching valve 52, the circulation pump 53, and the air conditioning controller 54 are provided.

The first switching valve 51, as illustrated in FIGS. 1 to 3, is provided at a branch position of a first branch circuit 45a where the heater core inlet circuit 45 and the liquid storage layer 50a of the cold energy storage tank 50 communicate.

The second switching valve 52, as illustrated in FIGS. 1 to 3, is provided at a branch position of a second branch circuit 46a where the heater core outlet circuit 46 and the liquid storage layer 50a of the cold energy storage tank 50 communicate.

Both the first and the second switching valves 51 and 52 switch between a valve closed state (see FIG. 5) where an inlet and an outlet of the liquid storage layer 50a are closed and the engine coolant is stored when the cooling operation is performed and a valve open state (see FIG. 9) where the inlet and the outlet of the liquid storage layer 50a are opened and the engine coolant flows to the heater core 9 after the cooling operation is stopped.

The circulation pump 53, as illustrated in FIG. 1 and FIG. 2, is provided at a halfway position of the heater core outlet circuit 46, and after the cooling operation is stopped, forcibly circulates the engine coolant with low temperature in the liquid storage layer 50a of the cold storage tank 50 to the heater core 9 by a pump operation.

The air-conditioning controller 54, as illustrated in FIG. 1, performs a switching control between the storing cold energy mode when the cooling operation is performed and the cooling supplement mode after the cooling operation is stopped by an operation control of both the first and the second switching valves 51 and 52 and the circulation pump 53 and a control of the air conditioning unit AU (an air mix door control, an indoor and outdoor air switching control, a PTC control, and a blower control). As illustrated in FIG. 1, input information is brought to the air-conditioning controller 54 by sensors and switches 55 such as temperature sensors of the cold energy storage tank, a surface immediately posterior to the evaporator and a surface immediately posterior to the heater core, and sensors and switches necessary for a normal air-conditioning control. In addition, the air-conditioning controller 54 is connected with an engine controller 56 by a CAN (control area network) communication line 57, and performs a coordinative control of an idling stop control where the engine 40 is temporarily stopped when stopping at a stop signal and a cooling supplement control where the cooling operation is supplemented after the cooling operation is stopped, while exchanging information of an engine stop signal and so on.

Figure 4:
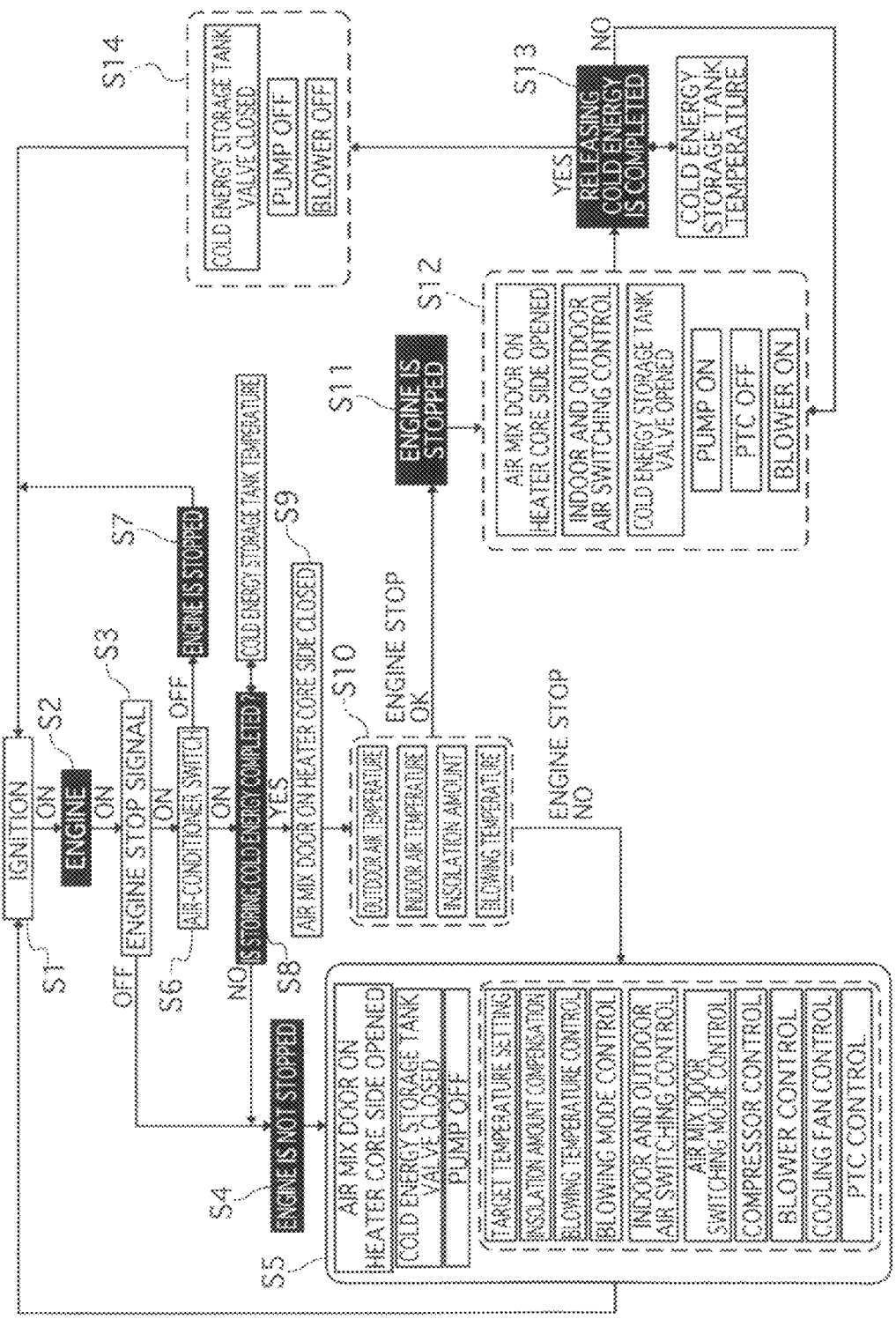
FIG. 4 is a flow chart illustrating a flow of a mode switching control operation executed by an air conditioning controller according to Embodiment 1.

FIG. 4 is a flow chart illustrating a flow of a mode switching control processing executed by the air-conditioning controller of Embodiment 1, and hereafter, each step by the mode switching controller will be explained.

In step S1, it is confirmed whether an ignition switch is turned on, and in step S2, it is confirmed whether the engine 40 is ON (a state where the engine is working), and when both of the above are confirmed, the processing moves to step S3.

In step S3, following a confirmation of the state where the engine is working in step S2, whether the engine stop signal is outputted from an engine controller 56 side or not is judged. When the engine stop signal is OFF, the processing moves to step S4, and when the engine stop signal is ON, the processing moves to step S6.

In step S4, following a confirmation of the engine stop signal being OFF in step S4, or a confirmation of incompletion of storing cold energy in step S8, without stopping the engine 40 and keeping the state where the engine is working, the processing moves to step S5.

In step S5, following the operation where the engine 40 is not stopped in step S4, whilst performing a control of the storing cold energy mode by an engine operation, the normal air-conditioning control and the PTC control are performed, and then the processing returns to step S1. The control in the storing cold energy mode is performed such that the second air mix door 8 is opened (air mix door on heater core side opened), both the first and the second switching valves 51 and 52 are closed (cold energy storage tank valve closed), the circulation pump 53 is stopped (pump OFF), and the engine coolant stored in the liquid storage layer 50a of the cold energy storage tank 50 is refrigerated by a refrigerant with low temperature and low pressure from the evaporator 6, except when the maximum cooling operation is performed. As the normal air-conditioning control, a target temperature setting, an insolation amount compensation, a blowing temperature control, a blowing mode control, an indoor and outdoor air switching mode control, an air mix door switching control, a compressor control, a blower control, a cooling fan control and so on are performed. As for the PTC control, when the engine starts in the winter, a cold place or the like, though there is a request for heating, when the engine coolant is at low temperature, a control to turn the PTC heater on to supplement heating is performed.

In step S6, following a judgment of the engine stop signal being ON in step S3, whether a switch of the air conditioner is turned OFF or ON is judged. When the switch of the air conditioner is turned OFF, the processing moves to step S7, and when the switch of the air conditioner is turned ON, the processing moves to step S8.

In step S7, following the judgment of the switch of the air conditioner being OFF, the engine 40 is stopped and then the processing returns to step S1.

In step S8, following the judgment of the switch of the air conditioner being ON, whether storing cold energy is completed or not is judged. In the case of YES, the processing moves to step S9, and in the case of NO, the processing moves to step S4. Here, a judgment of a completion of storing cold energy in the cold energy storage tank 50 is performed based on a temperature of the cold energy storage tank from the temperature sensor of the cold energy storage tank, and information of temperatures of the surface immediately posterior to the evaporator and the surface immediately posterior to the heater core is considered together.

In step S9, following the judgment of a completion of storing cold energy by the cold energy storage tank in step S8, the second air mix door 8 is closed (air mix door on heater core side closed), and then the processing moves to step S10.

In step S10, following the air mix door on the heater core side being closed in step S9, whether an environment where the cooling operation is stopped or not is judged. When it is judged as the environment where the cooling operation is continued, it is judged as "engine stop NO", and then the processing moves to step S5 without stopping the engine 40. When it is judged as the environment where the cooling operation is allowed to be stopped, based on the judgment of "engine stop OK", then the processing moves to step S11. Here, as information for the judgment of the environment if the cooling operation is stopped or not, an outdoor air temperature, a car cabin temperature, an insolation amount, a blowing temperature and so on are used. That is, in a state of scorching heat in the summer or the like, when it is judged as the environment where the cooling operation is continued, the cooling operation is continued without stopping the engine 40.

In step S11, following the judgment of the environment which is allowed to stop the cooling operation in step S10, the engine 40 is stopped, and then the processing moves to step S12. That is, when a condition of an engine stop request (ON in step S3), a condition of an air-conditioning unit operation (ON in step S6), a condition of a completion of storing cold energy (YES in step S8), and a condition of a permission of stopping the cooling operation (engine stop OK in step S10) are satisfied, the engine 40 is stopped.

In step S12, following stopping the engine in step S11, the cooling supplement mode is started by opening both the first and the second switching valves 51 and 52 (cold energy storage tank valve opened), operating the circulation pump 53 (pump ON), operating the blower 4 of the air-conditioning unit AU (blower ON), judging a load by indoor and outdoor air temperatures and selecting a position from an outdoor air introduction position and an indoor air circulation position where a load is lower, switching the air intake door 2 to the selected position (indoor and outdoor air switching control), and opening the second air mix door 8 (air mix door on heater core side opened), and then the processing moves to step S13.

In step S13, following controlling by the cooling supplement mode in step S12, whether releasing cold energy in the cold energy storage tank 50 is completed or not is judged. When it is judged to be NO, the processing returns to step S12 and continues the cooling supplement mode, and when it is judged to be YES, the processing moves to step S14. Here, a judgment of a completion of releasing cold energy in the cold energy storage tank 50 is performed by a temperature of the cold energy storage tank based on the temperature sensor of the cold energy storage tank as well as the judgment of the completion of storing cold energy, and information of temperatures of the surface immediately posterior to the evaporator and the surface immediately posterior to the heater core is also considered.

In step S14, following the judgment of the completion of releasing cold energy in the cold energy storage tank 50 in step S13, the cooling supplement mode is finished by closing both the first and the second switching valves 51 and 52 (cold storage tank valve closed), stopping the circulation pump 53 (pump OFF), and stopping the blower 4 of the air-conditioning unit AU, and then the processing returns to step S1.

Next, the reason the present invention has been made, and how, will be explained. In recent years, an idling stop where an engine is temporarily stopped when parking and stopping a car has drawn attention, because an improvement of gas mileage and an improvement of environment by decrease in emission gas have been demanded, and not only an idling stop where the engine is manually stopped and started but also cars mounted with a semi-automatic or an automatic idling stop control system have been realized. For example, as for a car mounted with a direct fuel-injection engine, it is possible to significantly shorten a time for starting the engine, and the idling stop control system such that the engine is stopped when the car stops, and the engine is started automatically when an operation by a clutch and/or a gear stick before starting is detected is adopted.

The above idling stop needs an engine start with a high fuel consumption; therefore if the engine is stopped only for a very short time, it does not serve as an improvement of gas mileage. For example, according to data of a 2000 cc automatic transmission car, an increasing amount of fuel when starting the engine corresponds to a 5-second idling. Accordingly, by stopping the engine for equal to or more than 5 seconds, an effect of improvement of gas mileage is obtained. In addition, in urban areas such that a stop time of a car ride time is almost the same as a moving time of the car ride time, 47% of the car ride time is the stop time, and it is also known that an effect of an approximately 14% improvement of fuel mileage is obtained by performing the idling stop for 25%, which is approximately half, of the stop time.

However, when moving whilst performing the cooling operation, if the idling stop is performed with priority, an air-conditioning unit mounted on a car performs the cooling operation by use of the compressor driven by the engine; therefore when the engine is stopped, a refrigerant circulation by the refrigeration cycle is stopped at the same time, and a refrigerant supply to the evaporator is stopped. Accordingly, after the engine is stopped, a cabin temperature rises for a short time, and an amenity in the car is damaged. In particular, in a case of a small car mounting a manual air-conditioning unit, etc., when the idling stop is performed, a temperature of a small cabin rapidly rises, and therefore the idling stop is rarely used in the present situation despite the improvement of gas mileage being demanded.

That is, when moving whilst performing the cooling operation, in order to ensure a long idling stop time without limitations by cooling in the cabin, it is important to be able to extend how much longer a supplement time for the cooling operation that continues a cold air supply to the cabin after the engine is stopped. For example, an average time for waiting for a traffic light to change is around 60 seconds. If it is possible to supplement the cooling operation for the time for waiting for the traffic light to change, the long idling stop time in which the engine is stopped is able to ensure a long time. And thus, the effects of the improvements of gas mileage and environment are obtained.

On the other hand, as for conventional cold energy storage systems for the vehicle, there is a problem such that any thermal energy storage capacities for cold energy are small. Therefore, the supplement time for the cooling operation is short, and after the engine is stopped, it is not able to achieve the supplement for the cooling operation for a requested time (for example, for around 60 seconds) by the stored cold energy when the cooling operation is performed.

As for the request for extending the supplement time for the cooling operation, an inventor of the present invention focuses on the engine coolant which circulates in a hot water system when the cooling operation is performed, but has less involvement in heat exchange than the refrigerant. And a structure such that the stored engine coolant is refrigerated by the refrigerant from the evaporator and the existing heater core is used for releasing cold energy is adopted. By an adoption of this structure, a cold energy storage ability is improved, the supplement time for the cooling operation is extended longer, and the amenity in the cabin is maintained.

Hereinafter, functions of the cold energy storage system of Embodiment 1, which are classified into "function of maximum cooling operation", "function of temperature control operation and storing cold energy operation", "function of completion of storing cold energy" and "function of supplementing cooling operation" will be explained.

[Function of Maximum Cooling Operation]

Figure 5:
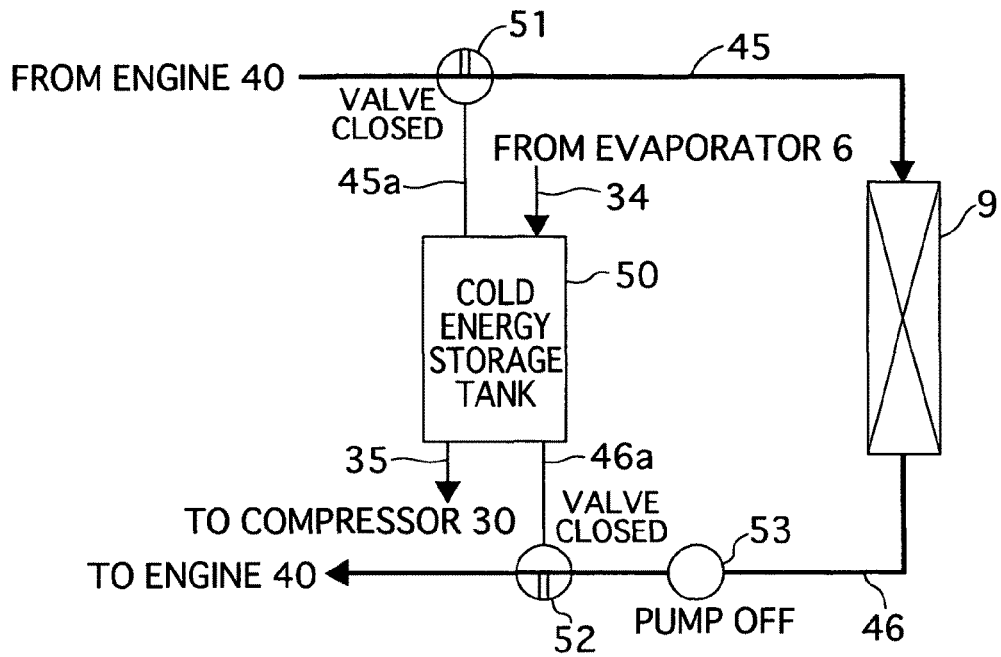
FIG. 5 is a function explanatory diagram illustrating a chief part for storing cold energy in a cooling/storing cold energy mode in the cold energy storage system for the vehicle according to Embodiment 1.
Figure 6:
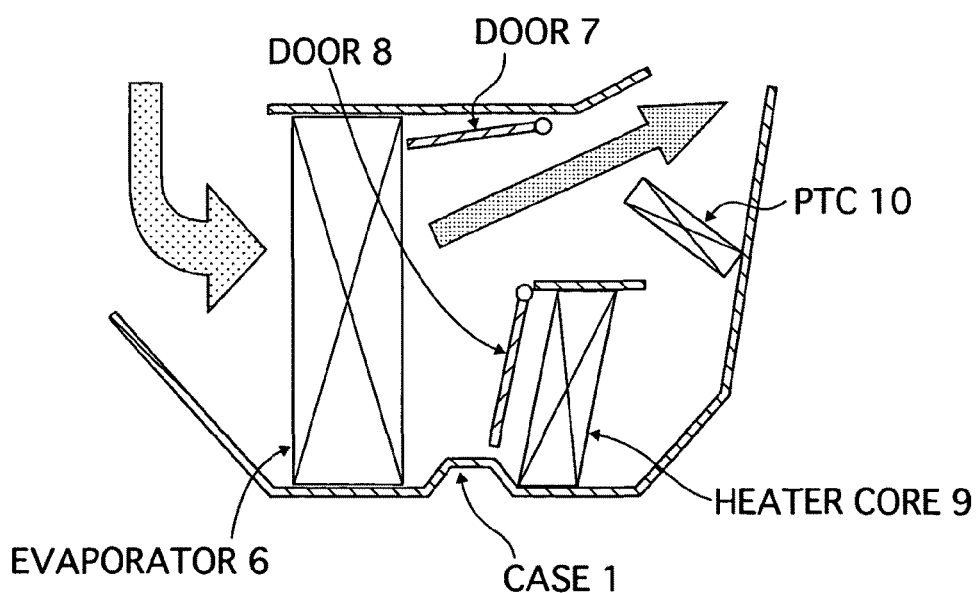
FIG. 6 is a cross-sectional diagram of a chief part illustrating an air conditioning unit AU when performing a maximum cooling operation in the cold energy storage system for the vehicle according to Embodiment 1.

FIG. 5 is a function explanatory diagram illustrating a chief part for storing cold energy in a cooling/storing cold energy mode in the cold energy storage system for the vehicle of Embodiment 1. FIG. 6 is a cross-sectional diagram of a chief part illustrating the air-conditioning unit AU at the maximum cooling operation in the cold energy storage system for the vehicle of Embodiment 1.

When the maximum cooling operation is performed in an engine operation state, a flow of step S1→step S2→step S3→step S4→step S5 is repeated, in the flow chart of FIG. 4. And, in step S5, as illustrated in FIG. 6, the first air mix door 7 is fully opened, and the second air mix door 8 is fully closed. In addition, as illustrated in FIG. 5, a normal engine coolant circulation circuit to the heater core 9 is structured such that both the first and the second switching valves 51 and 52 are closed (valve closed), which blocks a flow to the first branch circuit 45a and the second branch circuit 46a, and a flow of the heater core inlet circuit 45 and the heater core outlet circuit 46 is allowed. And as for the circulation pump 53, as illustrated in FIG. 5, the pump operation is stopped (pump OFF).

Therefore, when the maximum cooling operation is performed, indoor air sent by the blower 4 is refrigerated by heat exchange in the evaporator 6 and becomes cold air, and the cold air passing through the evaporator 6 passes through the vent door 13→the vent outlet 16→the vent duct 19→the vent grill 22, and then is blown out from the left and right positions and the center position of the front seats in the cabin (maximum cooling operation).

When the maximum cooling operation is performed, by heat exchange with a large air volume and large temperature difference performed in the evaporator 6, the temperature of the refrigerant from the evaporator 6 is increased; therefore the engine coolant stored in the liquid storage layer 50a of the cold energy storage tank 50 is only refrigerated by the small amount of remaining cold energy that the refrigerant from the evaporator has.

[Function of Temperature Control Operation and Storing Cold Energy Operation]

Figure 7:
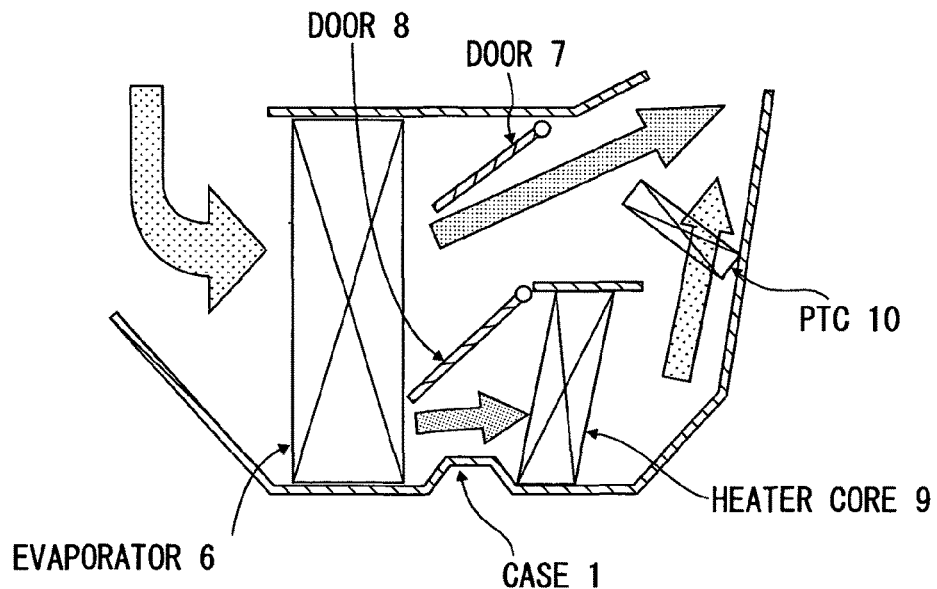
FIG. 7 is a cross-sectional diagram of the chief part illustrating the air conditioning unit AU when performing temperature control operation and storing cold energy operation in the cold energy storage system for the vehicle according to Embodiment 1.

FIG. 7 is a cross-sectional diagram of a chief part illustrating the air-conditioning unit AU, when the temperature control operation and storing cold energy operation are performed, in the cold energy storage system for the vehicle of Embodiment 1.

When the temperature control operation and storing cold energy operation are performed in the engine operation state, a flow of step S1→step S2→step S3→step S4→step S5 is repeated, in the flow chart of FIG. 4. In step S5, as illustrated in FIG. 7, the first air mix door 7 is partly opened, and the second air mix door 8 is partly opened. In addition, as illustrated in FIG. 5, a normal engine coolant circulation circuit to the heater core 9 is structured such that both the first and the second switching valves 51 and 52 are closed (valve closed), which blocks a flow to the first branch circuit 45a and the second branch circuit 46a, and a flow of the heater core inlet circuit 45 and the heater core outlet circuit 46 is allowed. And as for the circulation pump 53, as illustrated in FIG. 5, the pump operation is stopped (pump OFF).

Therefore, when the temperature control operation and storing cold energy operation are performed and when a vent mode is selected, the air passing through the evaporator 6 of indoor air or outdoor air sent by the blower 4 is refrigerated by heat exchange and becomes cold air, and the air passing through the heater core 9 and the PTC heater 10 is heated by heat exchange and becomes hot air. And then the mixed air where the cold and hot air are mixed and temperature-controlled passes through the vent door 13→the vent outlet 16→the vent duct 19→the vent grill 22, and then is blown out from the left and right positions and the center position of the front seats in the cabin. In a case where the temperature of the air blown out is desired to be decreased, it is controlled by increasing the door opening of the first air mix door 7, and in a case where the temperature of the air blown out is desired to be increased, it is controlled by increasing the door opening of the second air mix door 8 (temperature control operation).

When the temperature control operation and storing cold energy operation are performed, by heat exchange with a small air volume and small temperature difference performed in the evaporator 6, the temperature of the refrigerant from the evaporator 6 is decreased; therefore the engine coolant stored in the liquid storage layer 50a of the cold energy storage tank 50 is refrigerated by the large amount of remaining cold energy that the refrigerant with low temperature and low pressure from the evaporator has (storing cold energy operation).

[Function of Completion of Storing Cold Energy]

Figure 8:
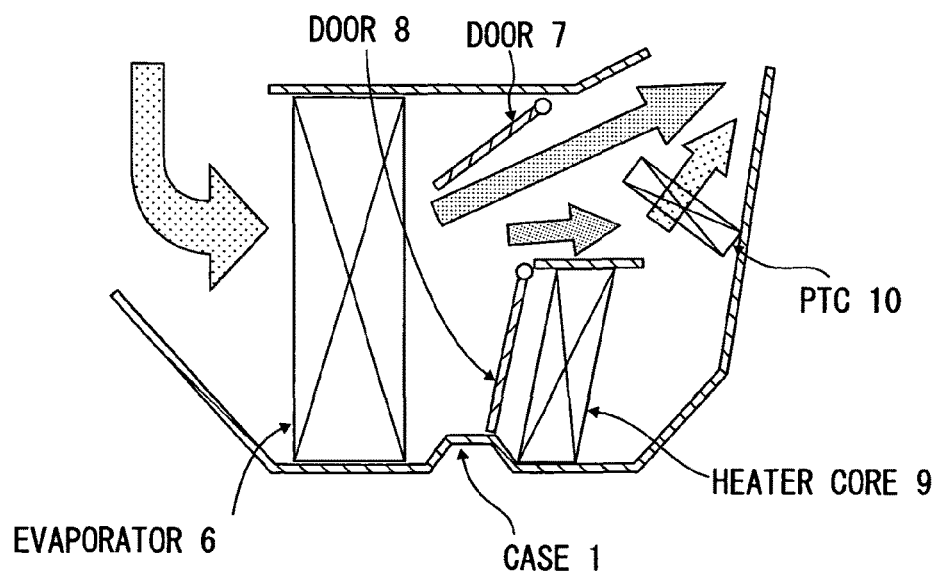
FIG. 8 is a cross-sectional diagram of the chief part illustrating the air conditioning unit AU when storing cold energy is completed in the cold energy storage system for the vehicle according to Embodiment 1.

FIG. 8 is a cross-sectional diagram of a chief part illustrating the air-conditioning unit AU at the completion of storing cold energy in the cold energy storage system for the vehicle of Embodiment 1.

When an engine stop signal is inputted from the engine controller 56 and storing cold energy is not finished, a flow of step S1→step S2→step S3→step S6→step S8→step S4→step S5 is repeated in the flow chart of FIG. 4. That is, the storing cold energy operation (FIG. 7) where the engine coolant stored in the liquid storage layer 50a of the cold energy storage tank 50 is refrigerated by the refrigerant with low temperature and low pressure from the evaporator 6 is continued, until the completion of storing cold energy is determined in step S8.

When the completion of storing cold energy is determined in step S8, the processing moves from step S8 to step S9, and in step S9, as illustrated in FIG. 8, the second air mix door 8 is closed. By the second air mix door 8 being closed, the cooling operation is enhanced to a maximum cooling operation side as only a flow of cold air, and progress of a refrigeration function of the engine coolant stored in the liquid storage layer 50a of the cold energy storage tank 50 is restrained.

In a state of the completion of storing cold energy as the second air mix door 8 is closed, in the flow chart of FIG. 4, the processing moves from step S9 to step S10, and in step S10, whether an environment where the cooling operation is stopped or not is judged. For example, under a circumstance of scorching heat in the summer and the like and only in a case where it is judged as the environment where the cooling operation is continued, it is judged as "engine stop NO", and the processing moves to step S4 without stopping the engine. On the other hand, except for the circumstance of scorching heat in the summer and the like and when it is judged as the environment where it is allowed to stop the cooling operation, based on a judgment of "engine stop OK", the processing moves to step S11, and the engine 40 is stopped and an idling stop control is started.

[Function of Supplementing Cooling Operation]

Figure 9:
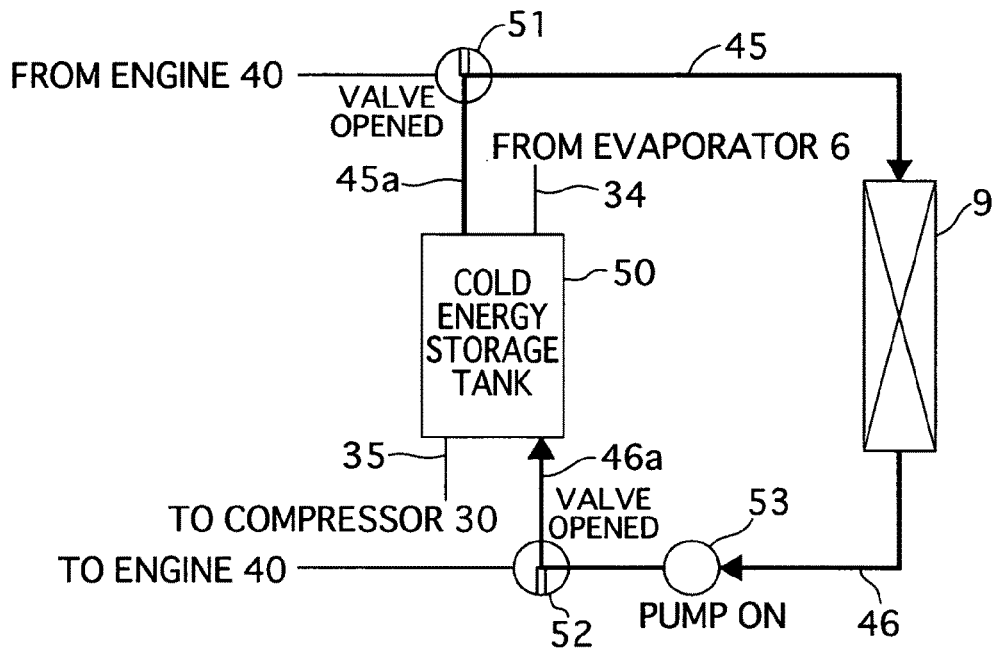
FIG. 9 is a function explanatory diagram illustrating a chief part for storing cold energy in a cooling supplement mode when an engine is stopped in the cold energy storage system for the vehicle according to Embodiment 1.
Figure 10:
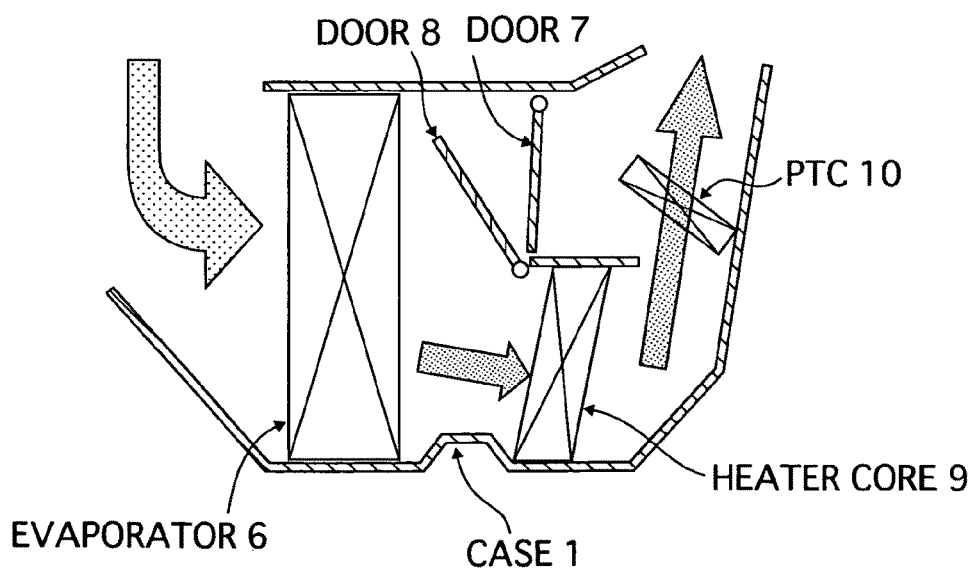
FIG. 10 is a cross-sectional diagram of the chief part illustrating the air conditioning unit AU in a state of cooling when an idling stop is performed in the cold energy storage system for the vehicle according to Embodiment 1.

FIG. 9 is a function explanatory diagram illustrating a chief part for storing cold energy in a cooling supplement mode when the engine is stopped, in the cold energy storage system for the vehicle of Embodiment 1. FIG. 10 is a cross-sectional diagram of a chief part illustrating the air-conditioning unit AU in a state of cooling when the idling stop is performed, in the cold energy storage system for the vehicle of embodiment 1.

In a case where a condition of an engine stop request (ON in step S3), a condition of an air-conditioning unit operation (ON in step S6), a condition of a completion of storing cold energy (YES in step S8), and a condition of a permission of stopping the cooling operation (engine stop OK in step S10) are satisfied, the processing moves to step S1→step S2→step S3→step S6→step S8→step S9→step S10→step S11→step S12 in the flow chart of FIG. 4. And in step S11, the engine 40 is stopped, and in step S12, an idling stop control is started. At the same time as this idling stop control is started, the cooling supplement mode is started by opening both the first and the second switching valves 51 and 52 (cold storage tank valve opened) and operating the circulation pump 53 (pump ON), as illustrated in FIG. 9, and operating the blower 4 of the air-conditioning unit AU (blower ON), and placing the air intake door 2 at a position of an outdoor air introduction position and an indoor air circulation position where a load is low (indoor and outdoor air switching control), and opening the second air mix door 8 (air mix door on heater core side opened).

Therefore, when the idling stop control is started, at the same time as this, the engine coolant with low temperature stored in the liquid storage layer 50a of the cold energy storage tank 50, as illustrated in FIG. 9, flows in a forced circulation manner where a flow of the first branch circuit 45a→the first switching valve 51→the heater core inlet circuit 45→the heater core 9→the heater core outlet circuit 46→the second branch circuit 46a is repeated, by the circulation pump 53. Accordingly, as illustrated in FIG. 10, when the air sent from the blower by the indoor air circulation passes through the heater core 9, heat of the air is absorbed by the engine coolant with low temperature, and the function of supplementing the cooling operation where the cold air passing through the heater core 9 is blown out in the cabin is exerted. The function of supplementing the cooling operation, in step S13, is continued until a completion of releasing cold energy in the cold energy storage tank 50 is determined.

Next, in step S13, when the completion of releasing cold energy in the cold energy storage tank 50 is determined, in step S14, the cooling supplement mode is finished by closing both the first and the second switching valves 51 and 52 (cold energy storage tank valve closed), and stopping the circulation pump 53 (pump OFF), and stopping the blower 4 of the air-conditioning unit AU As described above, as for the cold energy storage system for the vehicle of Embodiment 1, when the cooling operation is performed mainly by the temperature control, the cold energy storage system is performed in the storing cold energy mode where the engine coolant stored in the liquid storage layer 50a of the cold energy storage tank 50 is refrigerated by the refrigerant from the evaporator 6, and after the cooling operation is stopped by the idling stop, it is switched to the cooling supplement mode where the refrigerated engine coolant in the liquid storage layer 50a of the cold energy storage tank 50 is introduced to the heater core 9.

That is, in the cooling supplement mode, the existing heater core in the air-conditioning unit is used as a cooler core to which the refrigerated engine coolant is introduced. Therefore, the structure of the existing air-conditioning unit remains the same, and advantages of cost and space are ensured only by adding the cold energy storage tank 50, both the first and the second switching valves 51 and 52 serving as the mode switcher, and the circulation pump 53.

In addition, the cold energy storage system for the vehicle of Embodiment 1 is performed by refrigerating by a refrigerant where an effect of refrigerating is higher than by refrigerating by cold air, and filling the engine coolant in the liquid storage layer 50a of the cool energy storage tank 50; therefore a storage amount of cold energy has a degree of freedom which is determined by setting a capacity of the cold energy storage tank 50. Therefore, after the cooling operation is stopped by the idling stop, a supplement time for the cooling operation is extended longer than the conventional cold energy storage systems, by enough cold energy being stored when the cooling operation is performed mainly by the temperature control. For example, as for a request for supplementing the cooling operation for an average time (around 60 seconds) of the idling stop by waiting for the traffic light to change, setting the capacity of the cold energy storage tank 50 makes it possible to adjust the supplement time for the cooling operation to the average time of the idling stop.

As for the cold energy storage system for the vehicle of Embodiment 1, the following effects are obtained.

(1) The cold energy storage system for the vehicle comprising the air-conditioning unit AU incorporating the evaporator 6 and the heater core 9 which stores cold energy when the cooling operation is performed and supplements the cooling operation by use of the stored cold energy after the cooling operation is stopped, includes the cold energy storage tank 50 which connects in parallel to the engine coolant circulation circuit to the heater core 9 and has the liquid storage layer 50a of the engine coolant and the refrigerant layer 50b where the refrigerant from the evaporator 6 flows, and the mode switcher which switches between the storing cold energy mode where the engine coolant stored in the liquid storage layer 50a is refrigerated by the refrigerant from the evaporator 6 when the cooling operation is performed and the cooling supplement mode where the engine coolant cooled in the liquid storage layer 50a is introduced to the heater core 9. Therefore, while the structure of the existing air-conditioning unit AU remains the same and advantages of cost and space are ensured, supplementing the cooling operation for the requested time is achieved by the stored cold energy during performing the cooling operation after the cooling operation is stopped.

(2) The mode switcher has the first and second switching valves 51 and 52 which switch between the valve closed state where the inlet and outlet of the liquid storage layer 50a are closed and the engine coolant is stored when the cooling operation is performed and the valve open state where the inlet and outlet of the liquid storage layer 50a are opened and the engine coolant flows to the heater core 9 after the cooling operation is stopped, the circulation pump 53 which forcibly circulates the refrigerated engine coolant between the liquid storage layer 50a and the heater core 9 after the cooling operation is stopped, and the air-conditioning controller 54 which performs the switching control between the storing cold energy mode when the cooling operation is performed and the cooling supplement mode after the cooling operation is stopped by the operation control of the first and second switching valves 51 and 52 and the circulation pump 53 and the control of the air-conditioning unit AU. Therefore, only by adding the operation control of the first and second switching valves 51 and 52 and the circulation pump 53 to the air-conditioning controller 54, the switching control between the storing cold energy mode when the cooling operation is performed and the cooling supplement mode after the cooling operation is stopped is performed.

(3) The air-conditioning controller 54, when in the storing cold energy mode by the engine operation, makes the first and the second switching valves 51 and 52 to be in the valve closed state, and stops the circulation pump 53 (step S5), and refrigerates the engine coolant stored in the liquid storage layer 50a by the refrigerant with low temperature and low pressure from the evaporator 6. Therefore, the engine coolant stored in the liquid storage layer 50a of the cold energy storage tank 50 is effectively refrigerated by a refrigerant refrigeration with a refrigeration effect higher than by a cold air refrigeration.

(4) When the condition of the engine stop request (ON in step S3), the condition of the air-conditioning unit operation (ON in step S6), and the condition of the completion of storing cold energy (YES in step S8) are satisfied, the air-conditioning controller 54 starts the cooling supplement mode by stopping the engine 40 (step S11), opening the first and second switching valves 51 and 52, operating the circulation pump 53 and operating the blower 4 of the air-conditioning unit AU, and placing the air intake door 2 at a position of the outdoor air introduction position and the indoor air circulation position where the load is low, and opening the heater core side of the air mix doors 7 and 8 (step S12). Therefore, in a case where storing energy is not completed although the condition of the engine stop request is demanded, the cooling supplement mode is not started until the condition of the completion of storing cold energy is satisfied, and by a cooperative control such that the supplement control of the cooling operation is performed when the idling stop control is performed, improving fuel mileage and environment characteristics and ensuring the amenity in the car are compatibly achieved.

(5) After the cooling supplement mode is started, when a condition of the completion of releasing cold energy is satisfied (YES in step S13), the air-conditioning controller 54 ends the cooling supplement mode by closing the first and second switching valves 51 and 52, stopping the circulation pump 53 and stopping the blower 4 of the air-conditioning unit AU (step S14). Therefore, the supplement time for the cooling operation for a suitable time for releasing the cold energy stored in the cold energy storage tank 50 is maintained, without ending the supplement for the cooling operation before releasing the cold energy and continuing the supplement for the cooling operation after releasing the cold energy.

(6) In the air-conditioning unit AU, the PTC heater 10 which supplements heating when the engine coolant is at low temperature though there is the request for heating is set in a downstream position of the heater core 9. Therefore, the heating operation is effectively supplemented instead of the heater core 9 when heating is demanded where the engine coolant is at low temperature. That is, the air-conditioning unit AU achieves both supplement functions of the cooling and heating operations.

(7) The cold energy storage tank 50 has an inside layer, an intermediate layer, and an outside layer. The inside layer serves as the liquid storage layer 50a of the engine coolant, the intermediate layer serves as the refrigerant layer 50b where the refrigerant from the evaporator 6 flows, and the outside layer serves as the vacuum insulation layer 50c. Due to a high thermal insulation property of the vacuum insulation layer 50c, the loss of the cold energy of the refrigerant from the evaporator 6 and the loss of the cold energy stored by the engine coolant of the liquid storage layer 50a are restrained smaller than by a tank without a vacuum insulation layer.

(8) The cold energy storage tank 50 is a stacked cold energy storage tank where the liquid storage layer 50a, the refrigerant layer 50b, and the vacuum insulation layer 50c are formed by alternately inverting and stacking a plurality of tank constructional elements 501 having the same shape and blocking an opening of the stacked tank constructional elements with an inlet-side lid plate 502 and an outlet-side lid plate 503. Therefore, in a case there is a request for changing the capacity of the cold energy storage tank 50 due to changes of the supplement time for the cooling operation, car types and so on, it is unnecessary to prepare tanks with different shapes per set capacity, and it is easy to respond to the request for changing the capacity only by changing the number of the stacked tank constructional elements 501.

Embodiment 2

Next, Embodiment 2 of the cold energy storage system for the vehicle according to the present invention will be explained.

Embodiment 2 is an example such that an outside layer of a cold energy storage tank is a cold energy storage material layer where a latent heat storage material is enclosed instead of a vacuum insulation layer.

Firstly, a structure of Embodiment 2 will be explained.

Figure 11:
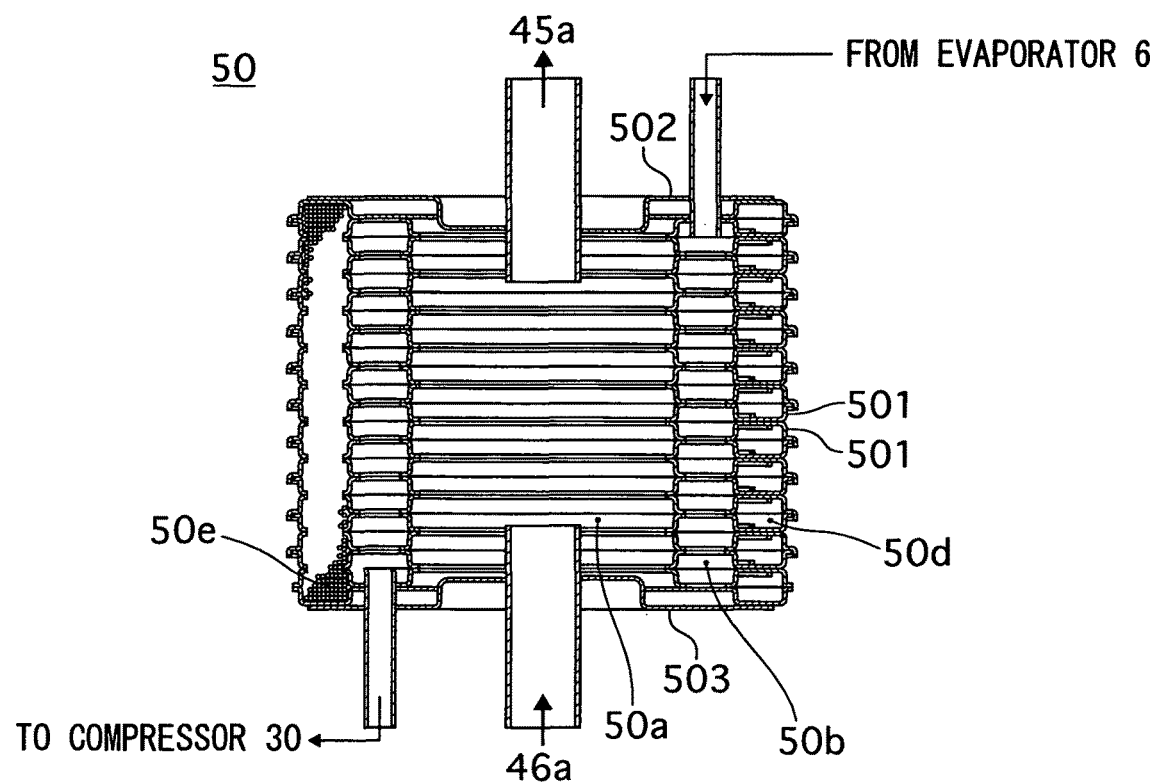
FIG. 11 is a cross-sectional diagram illustrating an example of a cold energy storage tank used for the cold energy storage system for the vehicle according to Embodiment 2 of the present invention.

FIG. 11 is a cross-sectional diagram illustrating an example of the cold energy storage tank used for a cold energy storage system of Embodiment 2.

The cold energy storage tank 50 of Embodiment 2, as illustrated in FIG. 11, has an inside layer, an intermediate layer, and an outside layer. The inside layer serves as a liquid storage layer 50a of the engine coolant, the intermediate layer serves as a refrigerant layer 50b where the refrigerant from the evaporator 6 flows, and the outside layer serves as a cold energy storage material layer 50d and where a latent heat storage material 50e performing heat release and absorption of heat with a phase transition is enclosed. Here, as the latent heat storage material 50e, for example, an encapsulated n-paraffin or a packaged n-paraffin is used. The n-paraffin covers a wide temperature range corresponding to the number of carbon chains (a freezing point −50 to 80 degrees C. (Celsius)), and latent heat of melting is also high, which is 130 to 250 kJ (kilojoule)/Kg.

In addition, the cold energy storage tank 50, as illustrated in FIG. 11, is a stacked cold energy storage tank where the liquid storage layer 50a, the refrigerant layer 50b, and the latent heat storage material 50e are formed by alternately inverting and stacking a plurality of tank constructional elements 501 having the same shape and blocking an opening of the stacked tank constructional elements with an inlet-side lid plate 502 and an outlet-side lid plate 503. Since the other system structure is similar to that of Embodiment 1, diagrammatic representation and explanation are not described.

Next, a function of Embodiment 2 will be explained. In the storing cold energy mode when the cooling operation is performed, the engine coolant in the liquid storage layer 50a is refrigerated by supplying the refrigerant from the evaporator 6 to the refrigerant layer 50a, and by supplying the refrigerant from the evaporator 6 to the refrigerant layer 50b, the latent heat storage material 50e in the cold energy storage material layer 50d is transformed from a liquid phase to a solid phase and cold energy is stored. And in the cooling supplement operation after the cooling operation is stopped, the engine coolant with low temperature is introduced to the heater core 9, and as the temperature of the engine coolant is increased, the latent heat storage material 50e in the cold energy storage material layer 50c is transformed from a solid phase to a liquid phase, and the stored cold energy is released, and the increase in the temperature of the engine coolant is restrained.

That is, in the cold energy storage system of Embodiment 2, due to enclosing the latent heat storage material 50e in the cold energy storage material layer 50d, a cold energy storage ability is improved compared to that of Embodiment 1, which is capable of making the increase in the temperature of blowing air in the cabin slower, when supplementing for the cooling operation is performed. Since the other function is similar to that of Embodiment 1, explanations are not described.

Next, effects of Embodiment 2 will be explained.

In the cold energy storage system for the vehicle of Embodiment 2, the following effect is obtained in addition to the effects (1) to (6), and (8) of Embodiment 1.

(9) The cold energy storage tank 50 has the inside layer, the intermediate layer, and the outside layer. The inside layer serves as the liquid storage layer 50a of the engine coolant, the intermediate layer serves as the refrigerant layer 50b where the refrigerant from the evaporator 6 flows, and the outside layer serves as the cold energy storage material layer 50d and where the latent heat storage material 50e performing heat release and absorption of heat with the phase transition is enclosed. Therefore, the cold energy storage ability is improved compared to that of Embodiment 1, which is capable of making the increase in the temperature of blowing air in the cabin slower when the supplement for the cooling operation is performed.

Although the cold energy storage system for the vehicle of the present invention has been explained based on Embodiments 1 and 2, it is not limited hereto. It should be appreciated that variations may be made in the embodiments described by persons skilled in the art without departing from the scope of the present invention as defined by the following claims.

Figure 12:
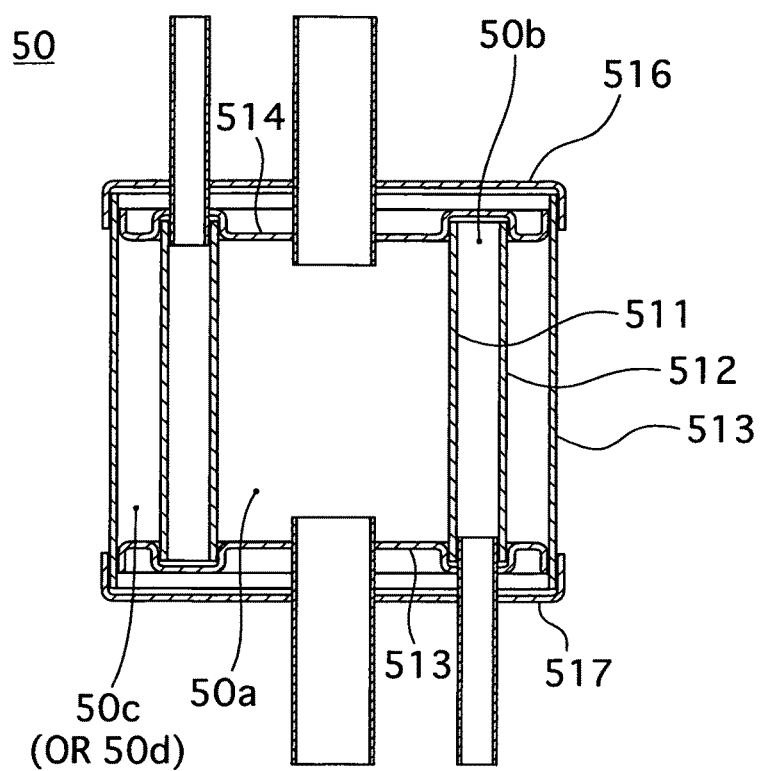
FIG. 12 is a cross-sectional diagram illustrating another example of the cold energy storage tank used for the cold energy storage system for the vehicle.

In Embodiments 1 and 2, examples using the stacked cold energy storage tank with an adaptability to variable capacities as the cold energy storage tank 50 have been described; however, for example, as illustrated in FIG. 12, a multi-layer cylinder cold energy storage tank may be used as the cold energy storage tank 50. In the case of this multi-layer cylinder cold energy storage tank, as illustrated in FIG. 12, it is structured such that an inner cylinder part 511, an intermediate cylinder part 512 and an outer cylinder part 513 are placed concentrically, and these are blocked with a first lid member 514 and a second lid member 515, and thereby the liquid storage layer 50a, the refrigerant layer 50b, and the vacuum insulation layer 50c (or the cold energy storage layer 50d) are divided, and additionally both end faces are covered with a first cover member 516 and a second cover member 517.

In Embodiments 1 and 2, as the mode switcher, examples structured by both the first and second switching valves 51 and 52, the circulation pump 53, and the air-conditioning controller 54 (mode switching controller) have been described; however the mode switcher is not limited to these structures, and various changes and additions may be made. That is, the cold energy storage system for the vehicle according to embodiments of the present invention comprises a cold energy storage tank connected in parallel to an engine coolant circulation circuit to a heater core and having a liquid storage layer of an engine coolant and a refrigerant layer where the refrigerant from an evaporator flows, and a mode switcher switching between a storing cold energy mode where the engine coolant stored in the liquid storage layer is refrigerated by the refrigerant from the evaporator when the cooling operation is performed and a cooling supplement mode where the refrigerated engine coolant in the liquid storage layer is introduced to the heater core, and it is not limited to Embodiment 1.

As described above, in the cold energy storage system for the vehicle of the present invention, when the cooling operation is performed, it is a storing cold energy mode in which the engine coolant stored in the liquid storage layer is refrigerated by the refrigerant from the evaporator. After the cooling operation is stopped, it is switched by the mode switcher to the cooling supplement mode where the refrigerated engine coolant in the liquid storage layer is introduced to the heater core. That is, in the cooling supplement mode, the existing heater core in the air-conditioning unit is used for the system as the cooler core which introduces the refrigerated engine coolant. Therefore, by only adding the cold energy storage tank and the mode switcher, the structure of the existing air-conditioning unit may remain the same. In addition, the refrigerant refrigeration has the refrigeration effect higher than the cold air refrigeration, and filling of the engine coolant is performed in the liquid storage layer of the cold energy storage tank; therefore a storage amount of the cold energy has a degree of freedom which is determined by setting of the capacity of the cold energy storage tank. Therefore, after the cooling operation is stopped, by the cold energy stored enough during performing the cooling operation, a supplement time for the cooling operation can be extended compared to conventional cold energy storage systems. For example, in response to a request for supplementing the cooling operation for an average time of an idling stop when waiting for the traffic light to change, it is possible to adjust the supplement time for the cooling operation to the average time of the idling stop by setting the capacity of the cold energy storage tank As a result, while the structure of the existing air-conditioning unit remains the same and advantages of cost and space are ensured, the supplement for the cooling operation for the requested time is achieved by the stored cold energy stored during performing the cooling operation, after the cooling operation is stopped.

In Embodiments 1 and 2, examples where the cold energy storage system is applied to an engine vehicle performing the idling stop control have been described; however the cold energy storage system is also applied to the cold energy system storage system of a hybrid vehicle and the like. That is, the cold energy storage system is applied to a cold energy storage system comprising the air-conditioning unit incorporating the evaporator and the heater core, and which stores cold energy when the cooling operation is performed and supplements the cooling operation by use of the stored cold energy after the cooling operation is stopped.

The invention claimed is:

1. A cold energy storage system for a vehicle having an air-conditioning unit with an evaporator and a heater core, where the cold energy storage system stores cold energy when a cooling operation is performed and supplements the cooling operation with use of the stored cold energy after the cooling operation is stopped, the cold energy storage system comprising:

a cold energy storage tank including a liquid storage layer that stores engine coolant, said liquid storage layer forming an inside layer of said storage tank, a refrigerant layer in which a refrigerant from the evaporator flows, said refrigerant layer forming an intermediate layer of said storage tank, and a vacuum insulation layer, said vacuum insulation layer forming an outside layer of said storage tank, wherein said storage tank connects in parallel to an engine coolant circulation circuit to the heater core;

a mode switcher which switches between a storing cold energy mode, where the engine coolant stored in said liquid storage layer is refrigerated by the refrigerant from the evaporator when the cooling operation is performed, and a cooling supplement mode, where refrigerated engine coolant in the liquid storage layer is introduced to the heater core after the cooling operation is stopped;

wherein said storage tank comprises a plurality of tank constructional elements that have openings, an inlet-side lid plate, and an outlet-side lid plate, wherein said plurality of tank constructional elements are stacked so as to form a stack of said tank constructional elements, and wherein said inlet-side lid plate and said outlet-side lid plate block said openings of said stack of said tank constructional elements.

2. The cold energy storage system for the vehicle according to claim 1, wherein the mode switcher includes:

a switching valve which switches between a valve closed state where an inlet and an outlet of the liquid storage layer are closed and the engine coolant is stored when the cooling operation is performed and a valve open state where the inlet and the outlet of the liquid storage layer are opened and the engine coolant flows to the heater core after the cooling operation is stopped;

a circulation pump which forcibly circulates the refrigerated engine coolant between the liquid storage layer and the heater core after the cooling operation is stopped; and a mode switching controller which performs a switching control between the storing cold energy mode when the cooling operation is performed and the cooling supplement mode after the cooling operation is stopped by an operation control of the switching valve and the circulation pump and a control of the air-conditioning unit.

3. The cold energy storage system for the vehicle according to claim 2, wherein the mode switching controller, in the storing cold energy mode by an engine operation, closes the switching valve and stops the circulation pump, and refrigerates the engine coolant stored in the liquid storage layer by a refrigerant with low temperature and low pressure from the evaporator.

4. The cold energy storage system for the vehicle according to claim 3, wherein, by satisfying a condition of an engine stop request, a condition of an air-conditioning unit operation and a condition of a completion of storing cold energy, the mode switching controller starts the cooling supplement mode by stopping an engine, opening the switching valve, operating the circulation pump, operating a blower of the air-conditioning unit, placing an air intake door to be at a position of an outdoor air introduction position and an indoor air circulation position where a load is small, and opening a temperature control door on a heater core side.

5. The cold energy storage system for the vehicle according to claim 4, wherein the mode switching controller ends the cooling supplement operation by closing the switching valve and stopping the circulation pump, and stopping the blower of the air-conditioning unit when a condition of a completion of releasing cold energy is satisfied after the cooling supplement mode is stopped.

6. The cold energy storage system for the vehicle according to claim 2, wherein, by satisfying a condition of an engine stop request, a condition of an air-conditioning unit operation and a condition of completion of storing cold energy, the mode switching controller starts the cooling supplement mode by stopping an engine, opening the switching valve, operating the circulation pump, operating a blower of the air-conditioning unit, placing an air intake door to be at a position of an outdoor air introduction position and an indoor air circulation position where a load is small, and opening a temperature control door on a heater core side.

7. The cold energy storage system for the vehicle according to claim 1, wherein in the air-conditioning unit a heating supplement device, which supplements heating when the engine coolant is at low temperature although there is a request for heating, is set in a downstream position of the heater core.

* * * * *